(12) United States Patent
Karaffa et al.

(10) Patent No.: US 8,856,302 B2
(45) Date of Patent: Oct. 7, 2014

(54) SYSTEMS AND METHODS FOR FOUNDATION FIELDBUS ALERTS

(75) Inventors: John Michael Karaffa, Roanoke, VA (US); Johnny Stephen Downor, Salem, VA (US); Steven William Smith, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 137 days.

(21) Appl. No.: 13/149,826

(22) Filed: May 31, 2011

(65) Prior Publication Data
US 2012/0310382 A1      Dec. 6, 2012

(51) Int. Cl.
*G05B 9/02* (2006.01)
*G06F 15/16* (2006.01)
*G05B 11/01* (2006.01)
*G05B 19/418* (2006.01)

(52) U.S. Cl.
CPC .. *G05B 19/4186* (2013.01); *G05B 2219/33151* (2013.01); *G05B 2219/34263* (2013.01); *G05B 2219/31369* (2013.01); *G05B 2219/32144* (2013.01)
USPC .............................. 709/223; 709/203; 700/80

(58) Field of Classification Search
CPC ................. G05B 19/4186; G05B 2219/31369; G05B 2219/34263
USPC .................................................. 709/201–253
See application file for complete search history.

(56) References Cited

U.S. PATENT DOCUMENTS

| | | | |
|---|---|---|---|
| 4,774,510 A * | 9/1988 | Steinke | 340/3.42 |
| 6,915,364 B1 | 7/2005 | Christensen et al. | |
| 7,146,230 B2 | 12/2006 | Glanzer et al. | |
| 7,272,457 B2 | 9/2007 | Glanzer et al. | |
| 7,468,731 B2 | 12/2008 | Eldridge et al. | |
| 7,478,333 B2 | 1/2009 | Shah et al. | |
| 7,478,337 B2 | 1/2009 | Kodosky et al. | |
| 7,480,906 B2 | 1/2009 | Joffrain et al. | |
| 7,568,017 B2 | 7/2009 | Shah et al. | |
| 7,594,220 B2 | 9/2009 | Kodosky et al. | |
| 7,594,226 B2 | 9/2009 | Stelzer et al. | |
| 7,610,354 B2 | 10/2009 | Adams et al. | |

(Continued)

FOREIGN PATENT DOCUMENTS

| | | |
|---|---|---|
| EP | 1 612 630 A1 | 1/2006 |
| EP | 1 903 411 A1 | 3/2008 |
| WO | WO03019304 | 3/2003 |

OTHER PUBLICATIONS

PDF file from http://www.kepware.com/News/kepware_releases_KEPServerEX_opc_server_version_5_1.asp Kepware Releases KEPServerEX OPC Server Version 5.1 (Oct. 21, 2009).*

(Continued)

*Primary Examiner* — Un C Cho
*Assistant Examiner* — Fangyan Deng
(74) *Attorney, Agent, or Firm* — Fletcher Yoder, P.C.

(57) ABSTRACT

An industrial process control system is provided. The industrial control system includes an alarm server with a processor configured to receive device information representative of field device information extracted from a device definition file. The processor is further configured to translate the device information into a first format interpretable by a global system for mobile communications (OPC AE) server and provide the device information in the first format to the OPC AE server.

20 Claims, 5 Drawing Sheets

(56) References Cited

U.S. PATENT DOCUMENTS

| | | | |
|---|---|---|---|
| 7,620,897 | B2 | 11/2009 | Shah et al. |
| 7,627,860 | B2 | 12/2009 | Kodosky et al. |
| 7,702,487 | B2 | 4/2010 | Sherrill et al. |
| 7,725,356 | B2 | 5/2010 | Shah et al. |
| 7,729,887 | B2 | 6/2010 | Sherrill et al. |
| 7,761,802 | B2 | 7/2010 | Shah et al. |
| 2004/0143621 | A1* | 7/2004 | Fredrickson et al. ......... 709/200 |
| 2007/0067725 | A1 | 3/2007 | Cahill et al. |
| 2007/0079250 | A1 | 4/2007 | Bump et al. |
| 2007/0129820 | A1 | 6/2007 | Glanzer et al. |
| 2007/0240052 | A1* | 10/2007 | Sherrill et al. ............... 715/700 |
| 2008/0004727 | A1 | 1/2008 | Glanzer et al. |
| 2008/0141170 | A1 | 6/2008 | Kodosky et al. |
| 2008/0141174 | A1 | 6/2008 | Kodosky et al. |
| 2008/0168092 | A1* | 7/2008 | Boggs et al. ............... 707/104.1 |
| 2008/0294771 | A1* | 11/2008 | Hermes et al. ................ 709/224 |
| 2009/0132940 | A1 | 5/2009 | Joffrain et al. |
| 2009/0259972 | A1 | 10/2009 | Kodosky et al. |
| 2009/0287914 | A1 | 11/2009 | Shah et al. |
| 2009/0292996 | A1 | 11/2009 | Anne et al. |
| 2010/0005425 | A1 | 1/2010 | Kodosky et al. |
| 2010/0011311 | A1 | 1/2010 | Kodosky et al. |
| 2010/0058188 | A1 | 3/2010 | Shah et al. |
| 2010/0205244 | A1* | 8/2010 | Todorov et al. ............... 709/203 |
| 2011/0022187 | A1* | 1/2011 | Felts et al. ......................... 700/9 |
| 2011/0022653 | A1* | 1/2011 | Werth et al. .................. 709/202 |

OTHER PUBLICATIONS http://zone.nl.com/devzone/cdaltut/p/id/3345, 12 pages, last viewed Aug. 2, 2011.
http://www.fieldbusinc.com/downloads/primer1_2.pdf revision 1.1, released Jun. 24, 2011, 36 pages.
U.S. Appl. No. 13/149,789, filed May 31, 2011, Karaffa et al.
U.S. Appl. No. 13/149,816, filed May 31, 2011, Karaffa et al.
U.S. Appl. No. 13/149,706, filed May 31, 2011, Karaffa et al.
U.S. Appl. No. 13/149,833, filed May 31, 2011, Karaffa et al.
U.S. Appl. No. 13/149,803, filed May 31, 2011, Karaffa et al.
U.S. Appl. No. 13/149,764, filed May 31, 2011, Karaffa et al.
U.S. Appl. No. 13/149,597, filed May 31, 2011, Karaffa et al.
U.S. Appl. No. 13/149,660, filed May 31, 2011, Karaffa et al.
U.S. Appl. No. 13/149,746, filed May 31, 2011, Karaffa et al.
U.S. Appl. No. 13/149,811, filed May 31, 2011, Karaffa et al.
U.S. Appl. No. 13/040,917, filed Mar. 4, 2011, Nekkar et al.
U.S. Appl. No. 13/103,864, filed May 9, 2011, Ojha et al.
U.S. Appl. No. 13/106,741, filed May 12, 2011, Ojha et al.
Search report issued in connection with EP Application No. 12169926.8, May 3, 2013.

\* cited by examiner

SYSTEMS AND METHODS FOR FOUNDATION FIELDBUS ALERTS

BACKGROUND OF THE INVENTION

The subject matter disclosed herein relates to foundation fieldbus process alarms and device alerts, and more specifically, to providing these alarms and alerts through the Object Linking and Embedding for Process Control Alarm and Event (OPC AE) protocol.

Certain systems, such as industrial control systems, may provide for alarm and alert monitoring and interaction capabilities for various types of devices, such as sensors, pumps, valves, and the like. However, the monitoring and interaction capabilities are often times controlled by distributed control systems provided by a variety of manufacturers. Accordingly, presenting these monitoring and interaction capabilities may be complex, costly, and time consuming.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an industrial process control system includes an alarm server with a processor, the alarm server configured to receive device information representative of field device information extracted from a device definition file of the field device. The alarm server is also configured to translate the device information from the controller into a first format interpretable by an OPC AE server, and provide the device information in the first format to the OPC AE server.

In a second embodiment, a method includes receiving, at an alarm server, device information for a field device extracted from a data definition file, using an alarm server. The method also includes translating, using a processor of the alarm server, the device information into a first format interpretable by an OPC AE server; and providing, from the alarm server, the device information in the first format to an OPC AE server.

In a third embodiment, a non-transitory, tangible computer readable medium includes executable code. The executable code includes instructions for obtaining device information from a database. The data in the database is representative of device information extracted from a device definition file of the field device. The code further includes instructions for translating the device information into a first format interpretable by an OPC AE server and providing the device information in the first format to an OPC AE server.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A typical Foundation Fieldbus device includes a Foundation Fieldbus Device Definition (DD) file, which may be provided by the manufacturer and includes information about the device in a format that is defined by the Foundation Fieldbus standard. This DD file may include device parameters, device descriptions, graphical symbols or icons to present the device on a graphical user interface, software blocks, and the like, in a binary format that is consumable by a portion of the components present within a control system. However, control systems produced by different manufacturers do not provide standard protocols to monitor and interact with certain components that interpret this device information. Therefore, these control systems may not have access to information in the DD file that may be useful in visualizing and/or managing the device. One possible standard interface between distributed control systems is the Object Linking and Embedding for Process Control Alarm and Event (OPC AE) protocol. As such, the disclosed embodiments provide the device information to an OPC AE server that enables the device information to be visualized and managed via the standard OPC AE protocol.

Figure 1:
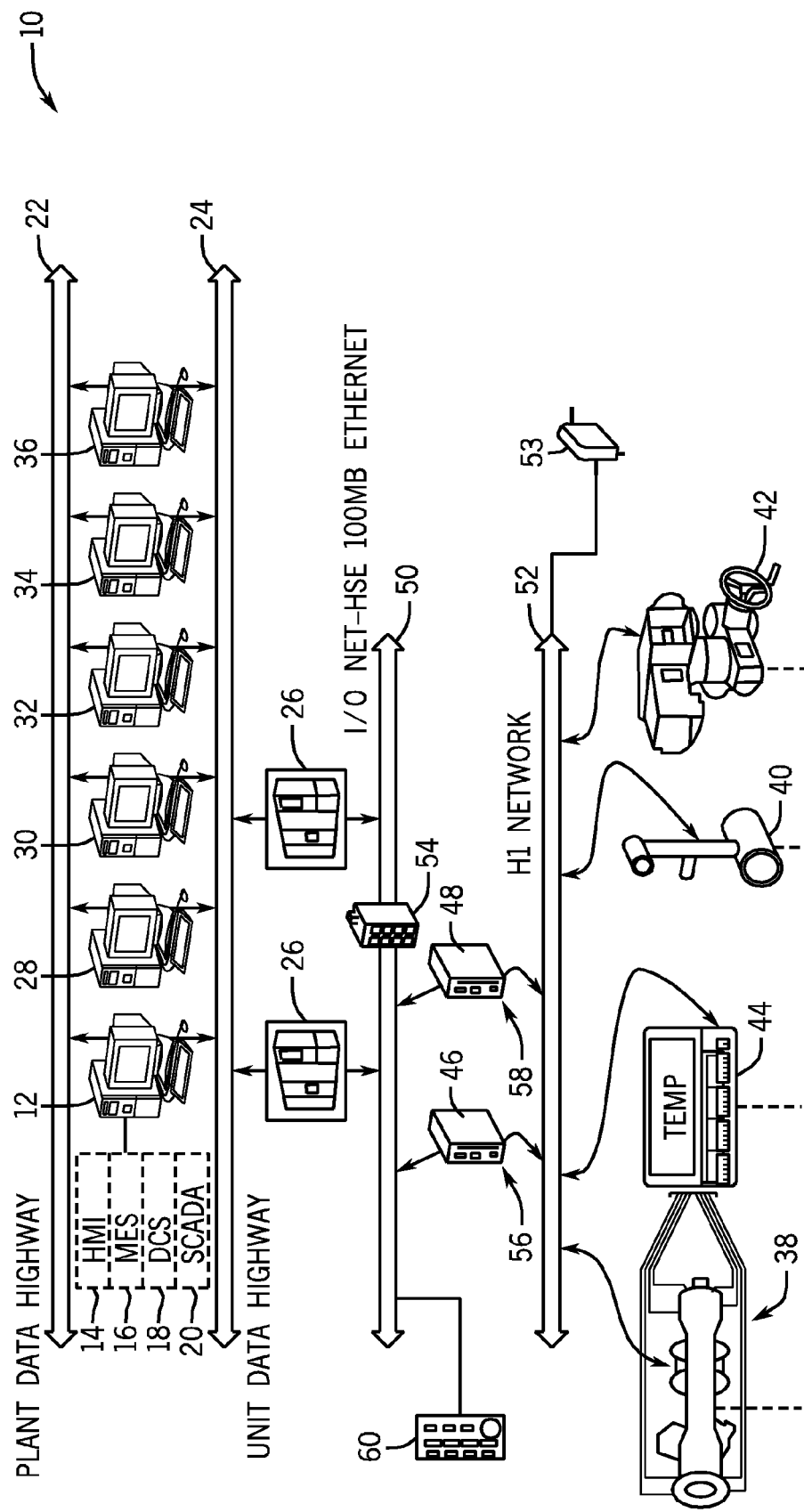
FIG. 1 is a schematic diagram of an embodiment of an industrial control system.

Turning to FIG. 1, an embodiment of an industrial process control system 10 is depicted. The control system 10 may include a computer 12 suitable for executing a variety of field device configuration and monitoring applications, and for providing an operator interface through which an engineer or technician may monitor the components of the control system 10. The computer 12 may be any type of computing device suitable for running software applications, such as a laptop, a workstation, a tablet computer, or a handheld portable device (e.g., personal digital assistant or cell phone). Indeed, the computer 12 may include any of a variety of hardware and/or operating system platforms. In accordance with one embodiment, the computer 12 may host an industrial control software, such as a human-machine interface (HMI) software 14, a manufacturing execution system (MES) 16, a distributed control system (DCS) 18, and/or a supervisor control and data acquisition (SCADA) system 20. For example, the computer 12 may host the ControlST™ software, available from General Electric Co., of Schenectday, N.Y.

Further, the computer 12 is communicatively connected to a plant data highway 22 suitable for enabling communication between the depicted computer 12 and other computers 12 in the plant. Indeed, the industrial control system 10 may include multiple computers 12 interconnected through the plant data highway 22. The computer 12 may be further communicatively connected to a unit data highway 24, suitable for communicatively coupling the computer 12 to industrial controllers 26. The system 10 may include other computers coupled to the plant data highway 22 and/or the unit data highway 24. For example, embodiments of the system 10 may include a computer 28 that executes a virtual controller, a computer 30 that hosts an Ethernet Global Data (EGD) configuration server, an Object Linking and Embedding for Process Control (OPC) Data Access (DA) server, an alarm server, or a combination thereof, a computer 32 hosting a General Electric Device System Standard Message (GSM) server, a computer 34 hosting an OPC Alarm and Events (AE) server, and a computer 36 hosting an alarm viewer. Other computers coupled to the plant data highway 22 and/or the unit data highway 24 may include computers hosting Cimplicity™, ControlST™, and Toolbox ST™.

The system 10 may include any number and suitable configuration of industrial controllers 26. For example, in some embodiments the system 10 may include one industrial controller 26 or two, three, or more industrial controllers 26 for redundancy. The industrial controllers 26 may enable control logic useful in automating a variety of plant equipment, such as a turbine system 38, a valve 40, and a pump 42. Indeed, the industrial controller 26 may communicate with a variety of devices, including but not limited to temperature sensors 44, flow meters, pH sensors, temperature sensors, vibration sensors, clearance sensors (e.g., measuring distances between a rotating component and a stationary component), and pressure sensors. The industrial controller 26 may further communicate with electric actuators, switches (e.g., Hall switches, solenoid switches, relay switches, limit switches), and so forth.

In the depicted embodiment, the turbine system 38, the valve 40, the pump 42, and the temperature sensor 44 are communicatively interlinked to the automation controller 26 by using linking devices 46 and 48 suitable for interfacing between an I/O NET 50 and a H1 network 52. For example, the linking devices 46 and 48 may include the FG-100 linking device, available from Softing AG, of Haar, Germany. In some embodiments, a linking device, such as the linking device 48, may be coupled to the I/O NET through a switch 54. In such an embodiment, other components coupled to the I/O NET 50, such as one of the industrial controllers 26, may also be coupled to the switch 54. Accordingly, data transmitted and received through the I/O NET 50, such as a 100 Megabit (MB) high speed Ethernet (HSE) network, may in turn be transmitted and received by the H1 network 52, such as a 31.25 kilobit/sec network. That is, the linking devices 46 and 48 may act as bridges between the I/O Net 50 and the H1 network 52. Accordingly, a variety of devices may be linked to the industrial controller 26 and to the computer 12. For example, the devices, such as the turbine system 38, the valve 40, the pump 42, and the temperature sensor 44, may include industrial devices, such as Foundation Fieldbus devices that include support for the Foundation H1 bi-directional communications protocol. In such an embodiment, a Foundation Fieldbus power supply 53, such as a Phoenix Contact Fieldbus Power Supply available from Phoenix Contact of Middletown, Pa., may also be coupled to the H1 network 53 and may be coupled to a power source, such as AC or DC power. The devices 38, 40, 42, and 44 may also include support for other communication protocols, such as those included in the HART® Communications Foundation (HCF) protocol, and the Profibus Nutzer Organization e.V. (PNO) protocol.

Each of the linking devices 46 and 48 may include one or more segment ports 56 and 58 useful in segmenting the H1 network 52. For example, the linking device 46 may use the segment port 56 to communicatively couple with the devices 38 and 44, while the linking device 48 may use the segment port 58 to communicatively couple with the devices 40 and 42. Distributing the input/output between the devices 38, 44, 40, and 42 by using, for example, the segment ports 56 and 58, may enable a physical separation useful in maintaining fault tolerance, redundancy, and improving communications time. In some embodiments, additional devices may be coupled to the I/O NET 50. For example, in one embodiment an I/O pack 60 may be coupled to the I/O NET 50.

Figure 2:
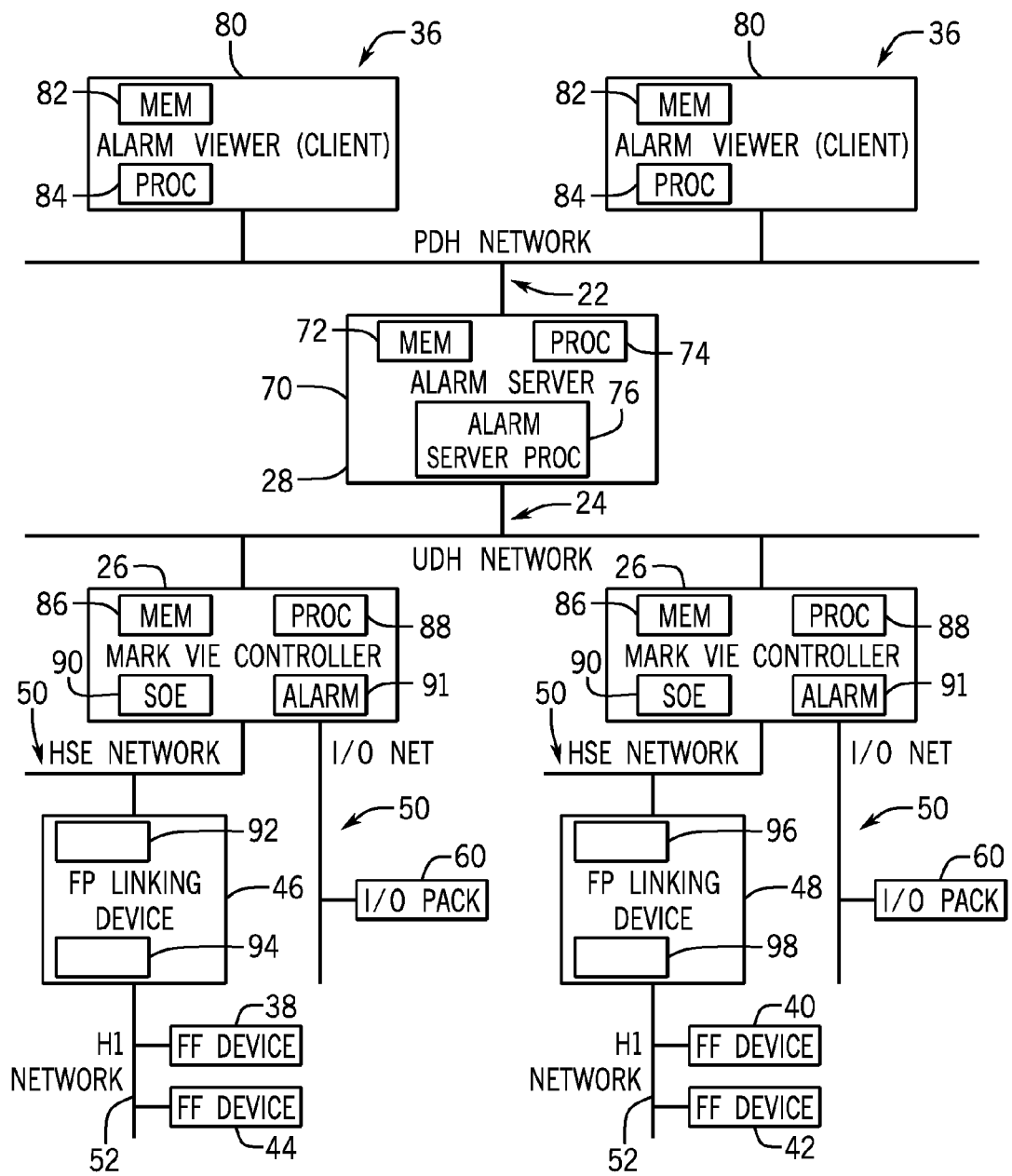
FIG. 2 is a block diagram of an embodiment of the industrial control system of FIG. 1, depicting various components in further detail.

In certain embodiments, the devices 38, 40, 42, and 44 may provide data, such as alerts, to the system 10. These alerts may be handled in accordance with the embodiments described below. FIG. 2 depicts a block diagram of an embodiment of the system 10 depicting various components in further detail. As described above, the system 10 may include an alarm server 70, executed on the computer 28, coupled to the plant data highway 22 and the unit data highway 24. The computer 28 may include a memory 72, such as non-volatile memory and volatile memory, and a processor 74, to facilitate execution of the alarm server 70. The alarm server 70 may execute an alarm process 76 for receiving, processing, and responding to alarms received from the controllers 26.

The system 10 may include additional computers 36 coupled to the plant data highway 22 that may execute alarm viewers 80. The alarm viewers 80 may enable a user to view and interact with the alarms processed by the alarm server 70. The computers 36 may each include a memory 82 and a processor 84 for executing the alarm viewer 80. Additionally, in some embodiments, the alarm viewers 80 may be executed on the computer 28 or any of the computers described above in FIG. 1. The alarm server 70 may communicate with the alarm viewers 80 using any suitable alarm data protocol interpretable by the alarm viewers 80.

As described above, the controllers 26 are coupled to the unit data highway 24, and the controllers 26 may communicate with the alarm server 70 over the unit data highway 24. For example, in one embodiment, the controllers 26 and alarm server 70 may communicate using a serial data interface (SDI) alarm protocol. The controllers 26 may each include a memory 86 and a processor 88 for executing the functions of the controllers 26. In one embodiment, the controllers 26 may execute a sequence of events (SOE) process 90 and an alarm process 91. As mentioned above, the controllers 26 may be coupled to the I/O pack 60 over the I/O NET 50. In one embodiment, the I/O pack 60 may communicate with the controllers 26 using the ADL protocol.

As also described above, the controllers 26 may be coupled to linking devices 46 and 48 through an I/O NET 50. The linking devices 46 and 48 may communicate with the controllers 26 over the I/O NET 50. The linking devices 46 and 48 may be coupled to the H1 network 52, and one linking device 46 may be coupled to devices 38 and 44 and another linking device 48 may be coupled to device 40 and 42. The linking device 46 may include a memory 92, such as volatile and non-volatile memory, and a processor 94, and the linking device 48 may include a memory 96, such as volatile and non-volatile memory, and a processor 98. In one embodiment, the linking devices 46 and 48 may communicate with the controllers 26 using the Foundation Fieldbus protocol.

The system 10 may enable alarm and diagnostic information to be communicated from the various devices to a user, such as through the HMI 14 and the alarm viewers 80. For example, the Foundation Fieldbus devices 38, 40, 42, and 44 may provide an alarm to the controller 26. The alarm may be provided from the controller 26 to the alarm server 70, which may process the alarm and provide information to the HMI 14, the alarm viewers 80, or any other computers coupled to the unit data highway 24 or plant data highway 22.

Foundation Fieldbus devices 38, 40, 42, and 44, may include a Foundation Fieldbus Device Definition (DD) file that may be typically provided by the device manufacturer based upon the Foundation Fieldbus specification. As such, a DD file may include instructions written in an International Electrotechnical Commission (IEC) 61804 language standard. A DD file may include device parameters or attributes (e.g., device identifiers, revision numbers, operational ranges, etc.), descriptions (e.g., device descriptions, parameter descriptions, alarm descriptions, etc.), graphical symbols or icons to represent the device (e.g., icon for healthy device, icon for device with alarm active, icon for deactivated device, etc.), and software blocks (e.g., sets of instructions that define actions for the device and the control system in response to certain events). The DD file may be in a binary format that is consumable by the Foundation Fieldbus components of the control system network (e.g., controller 26).

However, distributed control systems from various manufacturers may not be configured to directly obtain information from a DD file for a particular device of the industrial process control system 10. For example, when the industrial process control system 10 detects an alarm condition from a Foundation Fieldbus device, it may be desirable to have some of the information typically included in the DD file to be presented to the operator of the distributed control system 18. For example, it may be useful for the industrial process control system 10 to also present the operator of the distributed control system 18 with information about the operational ranges of the device, appropriate and standardized icons for the device in its present state, and description information about the device, its parameters, and its alarms. As such, it may be useful for the alarm server 70 to provide more complete information about the device to the operator. Additionally, since some distributed control systems have limited standard communication protocols, it may be beneficial to provide the information in such a standardized format (e.g., the OPC AE protocol).

Figure 3:
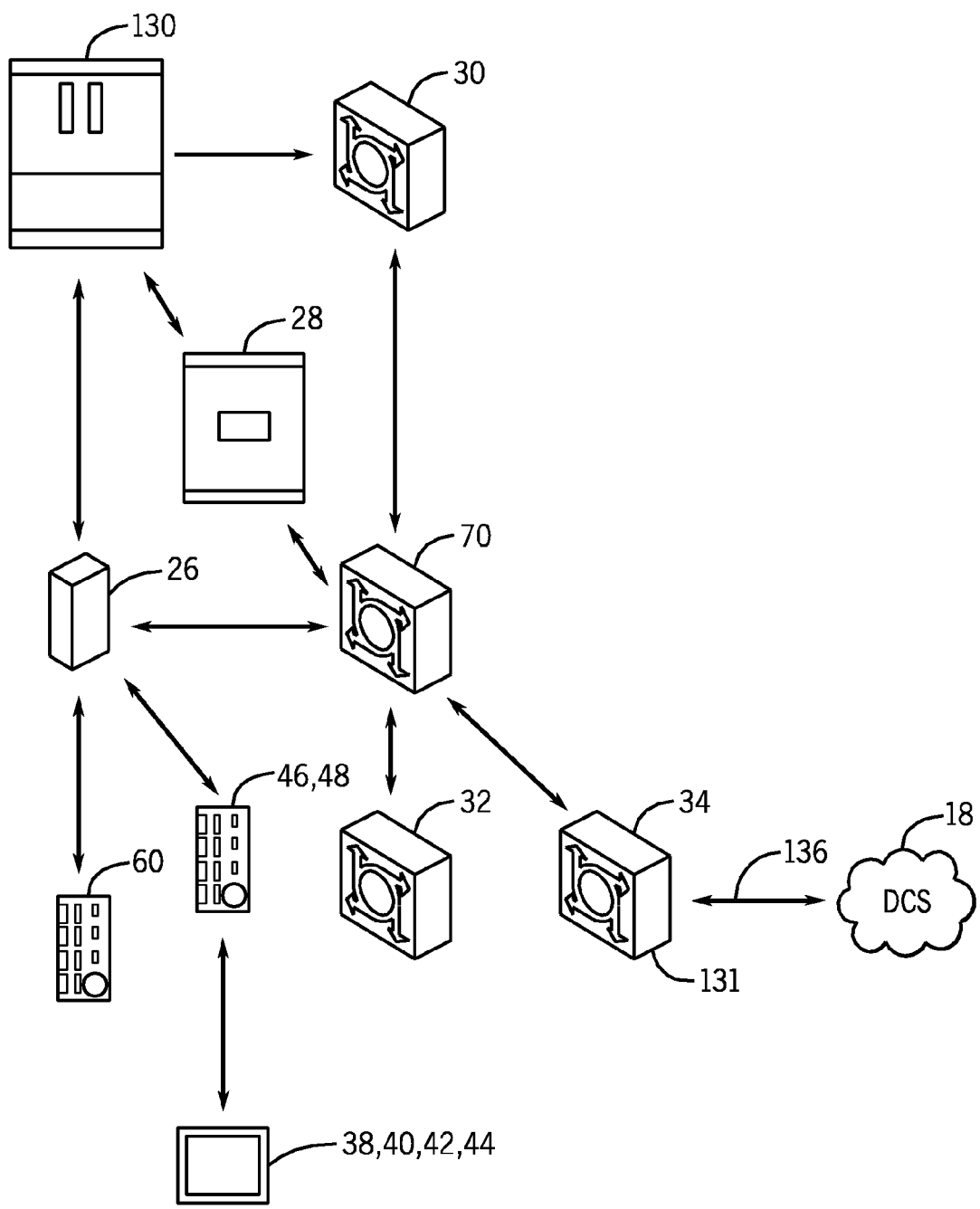
FIG. 3 is a schematic diagram of an embodiment of an industrial control system with an OPC AE server.

With the foregoing in mind, FIG. 3 illustrates an embodiment of the industrial control system 10 illustrating the providing of Foundation Fieldbus alarms and alerts to distributed control systems via the OPC AE protocol. In the illustrated embodiment, a Foundation Fieldbus device (e.g., 38, 40, 42, 44) provides an alarm or alert data to the controller(s) 26. For example, the alarm or alert data may include process alarm data, sequence of events data, process holds data, process events data, and/or diagnostic alarm data. Diagnostic alarms are generated by predetermined conditions that are not defined by a user. Process alarms are generated by user-defined conditions configured in the industrial process control system 10.

Process alarms may include Boolean alarms, analog process alarms, Boolean process events, and Boolean process holds. The Boolean alarms are triggered upon an alarm property of the Foundation Fieldbus device (e.g., 38, 40, 42, 44) transitioning from "true" to "false" or from "false" to "true". Analog process alarms may include bad quality alarming, deviation hysteresis alarming, multi-level high and low threshold alarming, and rate of change hysteresis alarming. Additionally, Boolean process holds restrict sequences of application code from being run until certain events occur by monitoring for a Foundation Fieldbus device's hold variable reaching a "true" state. Upon reaching the "true" state, the next phase of the application code sequence may be executed. Finally, IO pack diagnostic alarms trigger upon detection of unusual circumstances of the IO pack internal variables, which are variables that illustrate how a device is functioning. The IO pack sequence of events provides a time stamped alert each time a configured control variable changes.

The controller(s) 26 provide controller diagnostic alarm data, sequence of event data, process alarm data, and/or IO pack diagnostic alarm data to a configuration system 130. In some embodiments, the configuration system 130 may be ToolboxST available from General Electric Co., of Schenectady, N.Y. Controller diagnostic alarms are triggered upon the controller(s) 28 detecting unusual circumstances. The configuration system 130 may be used to configure the alarm and alert settings for each of the alarm or alert data mentioned above. Additionally, the controller(s) 26 provide the process alarm data, controller diagnostic alarm data, sequence of events data, and/or IO pack diagnostic alarm data to the alarm server 70. Upon receiving an IO pack diagnostic alarm, an IO pack sequence of events, and/or a control diagnostic alarm, the alarm server 70 queries the EGD server 30 for human readable text for the associated data. Based on the query from the alarm server 70, the EGD server 30 provides human readable text to the alarm server 70. Once the alarm server 70 obtains the human readable text, the server 70 may publish the human readable text to the computer 34 hosting the OPC AE server 131. The computer 34 running the OPC AE server 131 then transmits the human readable text to distributed control systems 18 that interface with the OPC AE server 131.

In addition to providing Foundation Fieldbus alarms and alerts to distributed control systems 18 that interface with the OPC AE server 131 of an industrial control system 10, it may be desirable to enable the distributed control systems 18 to interact with the with Foundation Fieldbus alarms and alerts. For example, the industrial control system 10 may acknowledge, lock, unlock, reset, silence alarm horns, unsilence alarm horns, or filter alarms and alerts. Alarms and alerts may be filtered based on being a fieldbus alert, being a process alarm, being triggered from a specific device, or being triggered from a specific area of the plant.

Boolean process alarms may be removed (i.e., no longer shown as a triggered alarm) by a networked client acknowledging the alarm, resetting the alarm values to normal, or instructing the alarm to reset. Boolean process events may be removed upon a networked client acknowledging the event, and Boolean process holds may be removed upon a networked client acknowledging the hold or instructing the hold to reset, or the hold's process values returning to a normal state.

Additionally, diagnostic alarms may be removed upon a networked client acknowledging the alarm or resetting the alarm, or the alarm returning to a normal state. IO pack sequences of events may be removed upon the sequence of events being acknowledged by a networked client. With regard to the controller(s) 26, the controller diagnostics may be removed upon a networked client acknowledging the alarm or instructing the alarm to reset, or the alarm returning to a normal state. The distributed content management systems 18 that interface with the OPC AE server 131 may provide the client instructions required to remove each of these Foundation Fieldbus alarms and events from the industrial control system 10. The distributed control systems 18 provide an alarm command (e.g., acknowledge alarm or reset alarm) to the OPC AE server 131 via a network 136. The OPC AE server 131 provides the alarm command to the alarm server 70. The alarm server 70 interprets the alarm command and provides the alarm command to the controller(s) 26. The controller(s) 26 then implements the commands provided by the distributed control systems 18.

Figure 4:
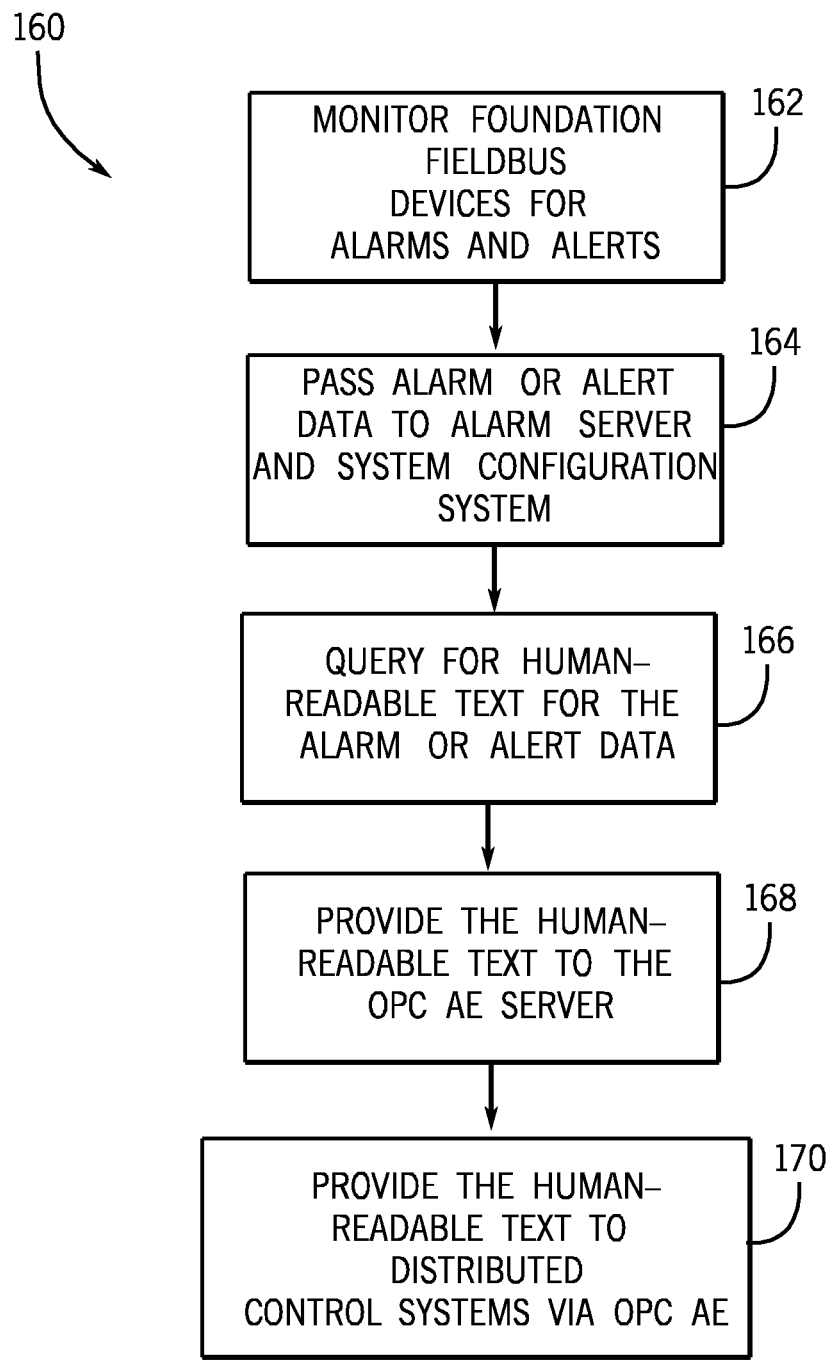
FIG. 4 is a flowchart illustrating a method for providing Foundation Fieldbus alarms and alerts to distributed control systems via the OPC AE protocol.

FIG. 4 is a flowchart illustrating a process 160 of providing Foundation Fieldbus alarms and alerts to distributed control systems via the OPC AE protocol. Some or all aspects of the process 160 may be implemented as executable code instructions stored on a non-transitory tangible machine-readable medium, such as memory 72, 82, 86, 92, or 96. Initially, one or more of the controllers 26 monitor the Foundation Fieldbus blocks of connected Foundation Fieldbus devices (e.g., 38, 40, 42, 44) for alarms or alerts (block 162). Upon determining that that an alarm or alert exists, the controllers 26 pass the alarm or alert data to the alarm server 70 and to the configuration system 130 (block 164). Next, the alarm server 70 translates the provided alarm or alert data into a format interpretable by the OPC AE server. For example, the alarm server may query an EGD server 30 for human-readable text corresponding to the alarm or alert data sent by the controllers 26 (block 166). Then, the alarm server 70 provides the human-readable text corresponding to the alarm or alert data to an OPC AE server 131 (block 168). Next, the OPC AE server 131 provides the human-readable text corresponding to the alarm or alert data to distributed control systems 18 configured to interface with the OPC AE server 131 (block 170).

Figure 5:
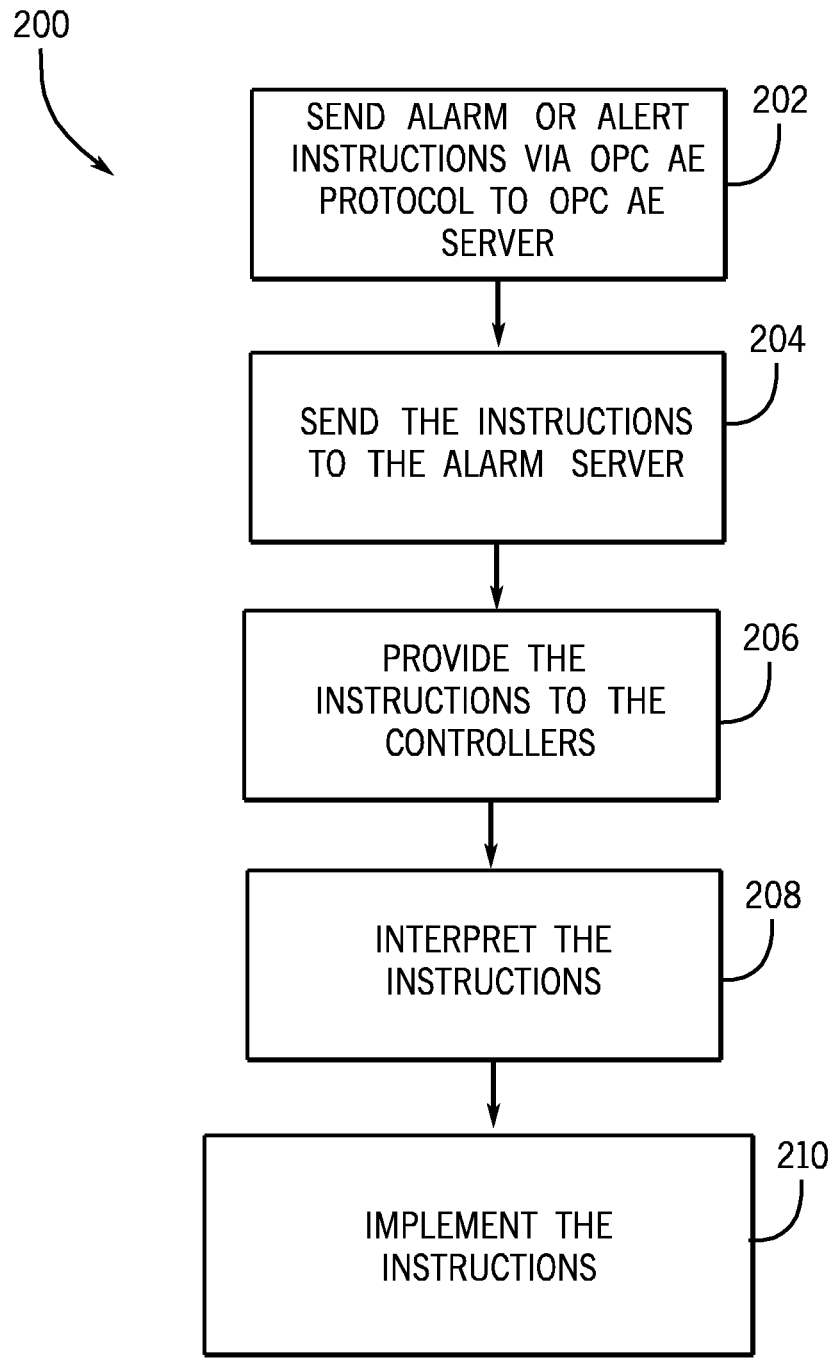
FIG. 5 is a flowchart illustrating a method of interacting with Foundation Fieldbus alarms and alerts via distributed control systems using the OPC AE protocol.

FIG. 5 is a flowchart illustrating a process 200 of interacting with Foundation Fieldbus alarms and alerts via distributed control systems 18 using the OPC AE protocol. Initially, the distributed control systems 18 may send an instruction, such as "acknowledge alert" or "reset alarm," via the OPC AE protocol to the OPC AE server 131 of the industrial control system 10 (block 202). Next, the OPC AE server 131 sends the instruction to the alarm server 70 (block 204), which in turn provides the instruction to the controllers 26 (block 206). The controllers 26 then interpret the instruction (block 208). Next, the controllers 26 implement the instruction either at the controllers 26 or the Foundation Fieldbus devices (e.g., 38, 40, 42, 44) (block 210).

Technical effects of the invention include an industry process control system that transmits Foundation Fieldbus alerts and alarms, for a variety of devices produced by different manufacturers, in a standard OPC AE interface, over a network. Control systems produced by different manufactures do not provide standard protocols to monitor and interact with certain components that interpret Foundation Fieldbus information. The standard interface enables distributed control systems of various manufactures that utilize an OPC AE protocol to receive Foundation Fieldbus alerts and alarms without requiring the production of a customized interface for each manufacturer's distributed control system. Thus, the complexity, cost, and time consumption necessary to transmit these Foundation Fieldbus alerts and alarms may be reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An industrial process control system comprising:
an alarm server comprising a processor, wherein the alarm server is configured to:
receive device information representative of a Foundation Fieldbus field device, wherein the device information comprises information extracted from a foundation fieldbus device definition (DD) file of the field device,
receive an alarm, an alert, or both from the field device, via a controller communicatively coupled to the alarm server;
provide the extracted device information with the alarm, the alert, or both, based upon the device information from a plurality of control systems of different manufacturers, through a standard interface of an Object Linking and Embedding for Process Control (OPC) Alarms and Events (OPC AE) protocol, communicating with an OPC AE server;
the extracted device information comprises:
operational ranges of the field device;
icons representative of a present state of the field device;
description information about the field device, parameters of the field device, or a combination thereof;
or a combination thereof;
wherein the extracted device information is used for visualizing, managing, or visualizing and managing the Foundation Fieldbus device, via the control system, regardless of a manufacturer of the control system and a manufacturer of the Foundation Fieldbus field device;
query a server for human-readable text corresponding to the alarm or alert data sent by the controller;
provide the human-readable text corresponding to the alarm or alert data to the OPC AE server;
and the OPC AE server provides the human-readable text corresponding to the alarm or alert data to distributed control systems configured to interface with the OPC AE server.

2. The industrial process control system of claim 1, further comprising the OPC AE server, wherein the OPC AE server is configured to receive the alarm, the alert, or both and the extracted device information, interpret the extracted device information, and provide the extracted device information to a networked client over an OPC AE protocol.

3. The industrial process control system of claim 2, wherein the OPC AE server is configured to receive one or more user operation commands from the networked client utilizing the OPC AE protocol, wherein the alarm server is configured to receive the one or more user operation commands from the OPC AE server and execute the one or more operation commands.

4. The industrial process control system of claim 3, wherein the alarm, the alert, or both and device information provided to the networked client is representative of a diagnostic alarm, and the one or more user operation commands comprise at least one of: unacknowledgement, lock, unlock, reset or silence alarm horn commands.

5. The industrial process control system of claim 3, wherein the alarm, the alert, or both and device information provided to the networked client is representative of an analog process alarm, and the one or more user operation commands comprise at least one of: unacknowledgement, lock, unlock, reset, silence, unsilence, or silence alarm horn commands.

6. The industrial process control system of claim 3, wherein the alarm, the alert, or both and the device information provided to the networked client is representative of a process hold, and the one or more user operation commands comprise at least one of: unacknowledgement, reset, override, remote override, silence, unsilence, or silence alarm horn commands.

7. The industrial process control system of claim 3, wherein the alarm, the alert, or both and the device information provided to the networked client is representative of a process event, and the one or more user operation commands comprise at least a silence alarm horn command.

8. The industrial process control system of claim 3, wherein the alarm, the alert, or both and the device information provided to the networked client is representative of a sequence of events, and the one or more user operation commands comprise at least a silence alarm horn command.

9. The industrial process control system of claim 1, wherein the field device comprises a Foundation Fieldbus device, a HART field device, a Profibus field device, or a combination thereof.

10. A method comprising: receiving, at an alarm server, device information representative of a Foundation Fieldbus field device, wherein the device information comprises information extracted from a foundation fieldbus data definition (DD) file;
receiving an alarm, an alert, or both from the field device, via a controller communicatively coupled to the alarm server;
providing the extracted device information, by a processor of the alarm server, the device information and the alarm, the alert, or both, based upon the device information from a plurality of control systems of different manufacturers, through a standard interface of an Object Linking and Embedding for Process Control (OPC) Alarms and Events (OPC AE) protocol, communicating with an OPC AE server;
the extracted device information comprises:
operational ranges of the field device;
icons representative of a present state of the field device;
description information about the field device, parameters of the field device, or a combination thereof;
or a combination thereof;
wherein the extracted device information is used for visualizing, managing, or visualizing and managing the Foundation Fieldbus device, via the control system, regardless of a manufacturer of the control system and a manufacturer of the Foundation Fieldbus field device;
providing the alarm, the alert, or both with the extracted information to an Object Linking and Embedding for Process Control (OPC) Alarms and Events (OPC AE) server, in a first format interpretable by the OPC AE server;
querying a server for human-readable text corresponding to the alarm or alert data sent by the controller;
providing the human-readable text corresponding to the alarm or alert data to the OPC AE server;
and the OPC AE server provides the human-readable text corresponding to the alarm or alert data to distributed control systems configured to interface with the OPC AE server.

11. The method of claim 10, wherein receiving the device information comprises receiving a Foundation Fieldbus alert.

12. The method of claim 10, comprising receiving, at the alarm server, one or more user operation commands relating to the alarm, the alert, or both and the device information, from the OPC AE server and executing the one or more user operation commands on the alarm, the alert, or both and the device information with the processor of the alarm server.

13. The method of claim 12, wherein the one or more user operation commands comprise user operation commands for one or more Foundation Fieldbus alerts.

14. The method of claim 10, wherein receiving device information and receiving the alarm, the alert, or both, comprises receiving the device information and receiving the alarm, the alert, or both, from a controller via a serial data interface (SDI) protocol.

15. The method of claim 10, wherein providing the alarm, the alert, or both and the device information comprises receiving human-readable text corresponding to the alarm, the alert, or both and the device information interpretable by the OPC AE server from an Ethernet Global Data (EGD) server.

16. The method of claim 10, comprising providing the alarm, the alert, or both and the device information, in the first format to distributed control systems over an OPC AE network via the OPC AE server.

17. A non-transitory, tangible computer readable medium comprising executable code, the code comprising instructions for: receiving, at an alarm server, device information representative of a Foundation Fieldbus field device, wherein the device information comprises information extracted from a foundation fieldbus data definition (DD) file;
receiving an alarm, an alert, or both from the field device, via a controller communicatively coupled to the alarm server;
providing the extracted device information, by a processor of the alarm server, the device information and the alarm, the alert, or both, based upon the device information from a plurality of control systems of different manufacturers, through a standard interface of an Object Linking and Embedding for Process Control (OPC) Alarms and Events (OPC AE) protocol, communicating with an OPC AE server;
the extracted device information comprises:
operational ranges of the field device;
icons representative of a present state of the field device;
description information about the field device, parameters of the field device, or a combination thereof;
or a combination thereof;
wherein the extracted device information is used for visualizing, managing, or visualizing and managing the Foundation Fieldbus device, via the control system, regardless of a manufacturer of the control system and a manufacturer of the Foundation Fieldbus field device;
providing the alarm, the alert, or both with the extracted information to an Object Linking and Embedding for Process Control (OPC) Alarms and Events (OPC AE) server, in a first format interpretable by the OPC AE server;
querying a server for human-readable text corresponding to the alarm or alert data sent by the controller;
providing the human-readable text corresponding to the alarm or alert data to the OPC AE server;
and the OPC AE server provides the human-readable text corresponding to the alarm or alert data to distributed control systems configured to interface with the OPC AE server.

18. The non-transitory, tangible computer readable medium of claim 17, the code comprising instructions for: receiving a request for the device information in the database via an OPC Alarms and Events (OPC AE) protocol; and responding to the request by sending the device information via the OPC AE protocol.

19. The non-transitory, tangible computer readable medium of claim 17, the code comprising instructions for: receiving one or more user operation commands related to the alarm, the alert, or both and the device information, over an OPC AE protocol and; executing the one or more user operation commands on the alarm, the alert, or both at the field device.

20. The non-transitory, tangible computer readable medium of claim 17, wherein the instructions for translating the alarm, the alert, or both and device information into the first format comprises obtaining human-readable text associated with the device information from an external server.

* * * * *

UNITED STATES PATENT AND TRADEMARK OFFICE
CERTIFICATE OF CORRECTION

Page 1 of 1

PATENT NO. : 8,856,302 B2
APPLICATION NO. : 13/149826
DATED : October 7, 2014
INVENTOR(S) : Karaffa et al.

It is certified that error appears in the above-identified patent and that said Letters Patent is hereby corrected as shown below:

In the claims

In Column 8, Lines 29-30, in Claim 1, delete "or a combination thereof; or a combination thereof;" and insert -- or a combination thereof; --, therefor.

In Column 9, Lines 44-45, in Claim 10, delete "or a combination thereof; or a combination thereof;" and insert -- or a combination thereof; --, therefor.

In Column 10, Line 9, in Claim 14, delete "both," and insert -- both --, therefor.

In Column 10, Line 11, in Claim 14, delete "both, from a" and insert -- both from the --, therefor.

In Column 10, Lines 45-46, in Claim 17, delete "or a combination thereof; or a combination thereof;" and insert -- or a combination thereof; --, therefor.

Signed and Sealed this
Twenty-seventh Day of October, 2015

Michelle K. Lee
*Director of the United States Patent and Trademark Office*